Dec. 17, 1935. G. F. GOODMAN, JR 2,024,353
MACHINE FOR MAKING POTATO CHIPS
Filed June 13, 1934 5 Sheets-Sheet 1
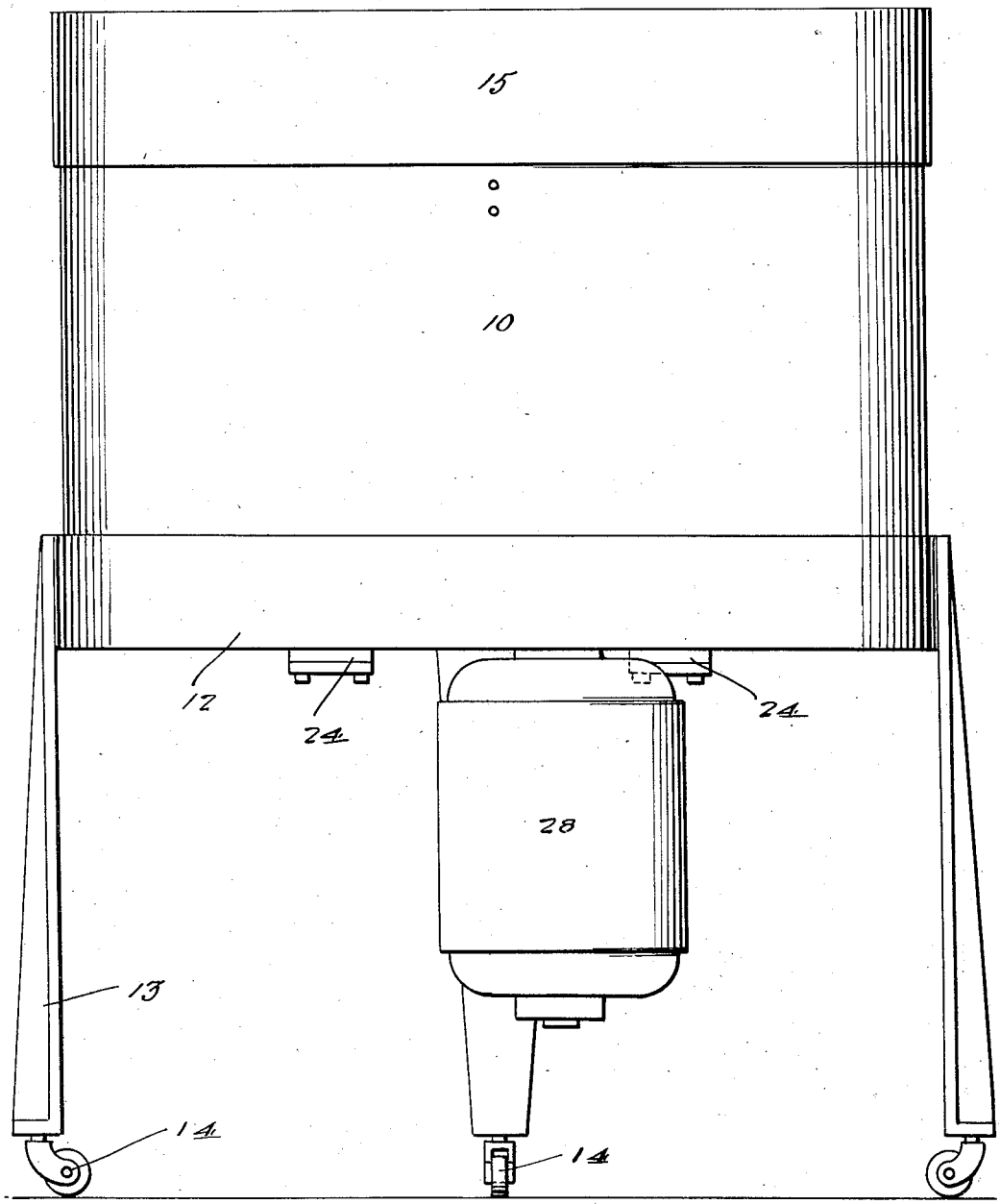
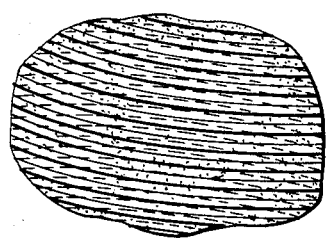
Inventor
G. F. Goodman, Jr.
By Clarence A. O'Brien
Attorney Dec. 17, 1935.  G. F. GOODMAN, JR  2,024,353
MACHINE FOR MAKING POTATO CHIPS
Filed June 13, 1934   5 Sheets-Sheet 2

Inventor

G. F. Goodman, Jr.

By Clarence A. O'Brien
Attorney

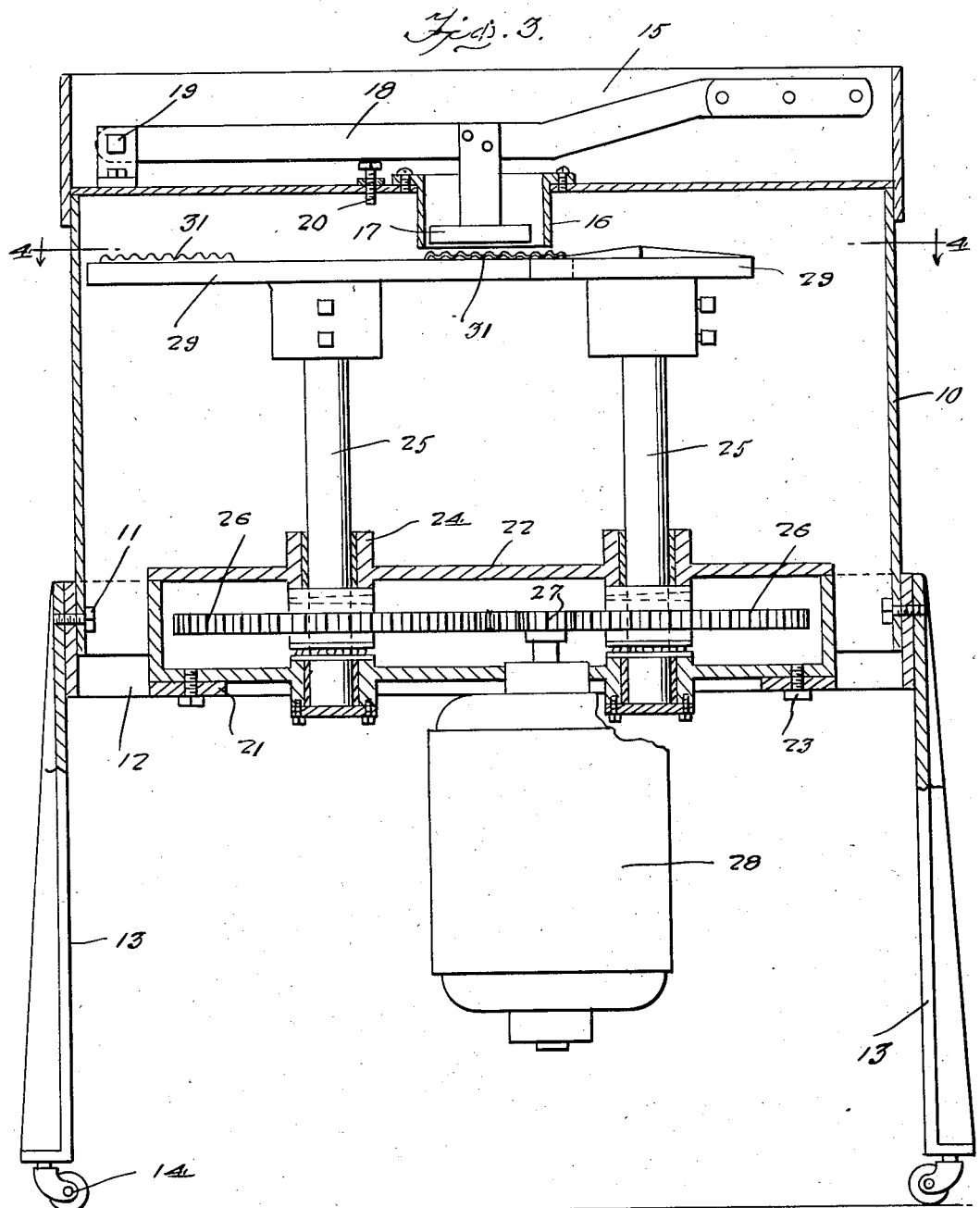

Dec. 17, 1935.    G. F. GOODMAN, JR    2,024,353
MACHINE FOR MAKING POTATO CHIPS
Filed June 13, 1934    5 Sheets-Sheet 4

Inventor
G. F. Goodman, Jr.
By Clarence A. O'Brien
Attorney

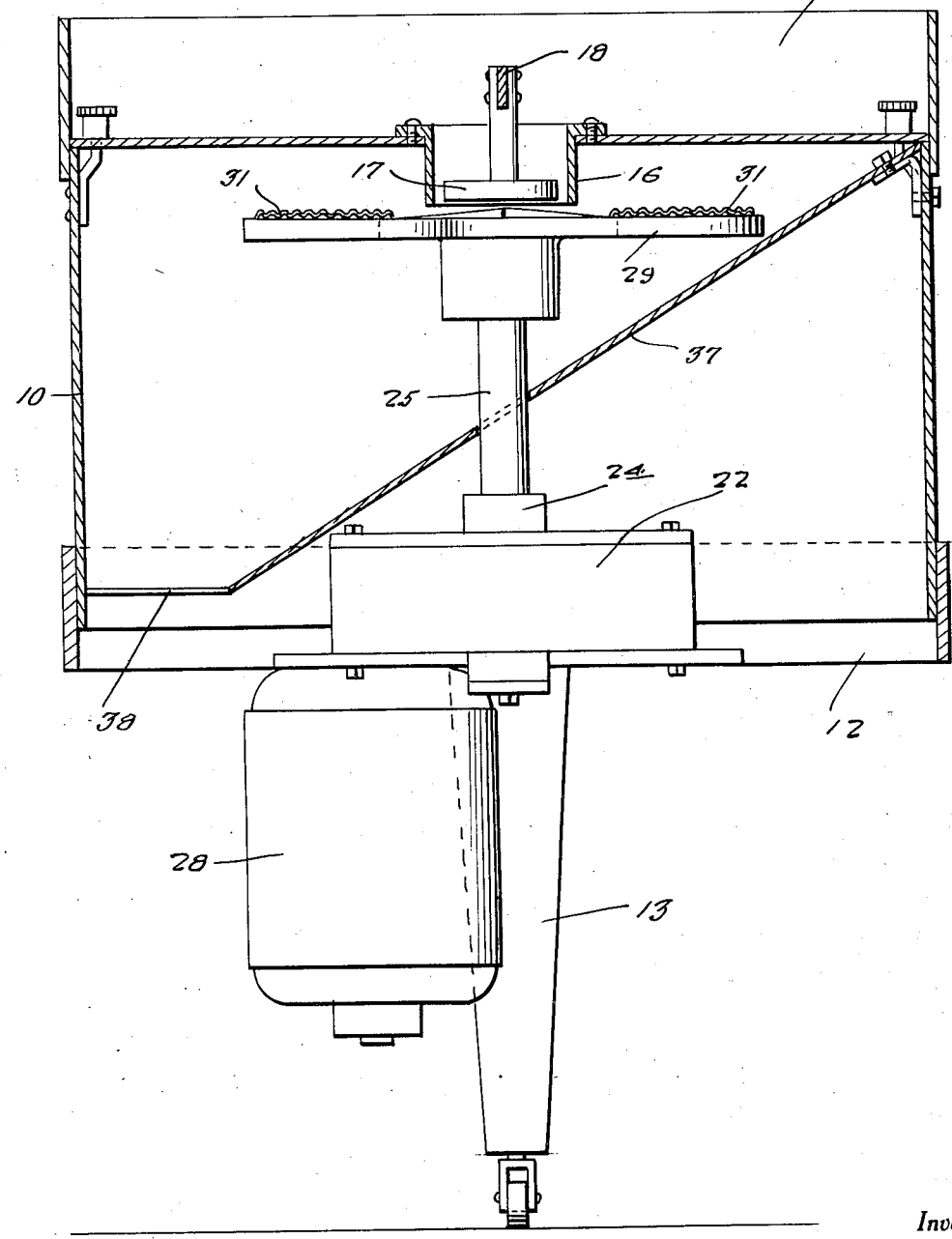

Patented Dec. 17, 1935

2,024,353

UNITED STATES PATENT OFFICE 2,024,353

MACHINE FOR MAKING POTATO CHIPS

George F. Goodman, Jr., Philadelphia, Pa.

Application June 13, 1934, Serial No. 730,525

4 Claims. (Cl. 146—78)

This invention has reference to a machine for making potato chips and the object of the invention is to provide a machine of this character having means for cutting the potatoes into slices or chips in a novel and efficient manner.

A still further object of the invention is to provide a machine for making potato chips which as a finished product resemble miniature waffles being provided on one side with curved grooves and on an opposite side with grooves curved oppositely to the grooves on the first side.

The invention together with its objects and advantages will be best understood from a study of the following description taken in connection with the accompanying drawings wherein:

Figure 1 is an elevational view of a machine embodying the features of the present invention.

Figure 3 is a vertical sectional view through the machine.

Figure 5 is a sectional view through the machine taken at right angles to Figure 3.

Figure 11 is an edge elevational view of the potato chip and

Figure 12 is a plan view of the potato chip.

Figure 2:
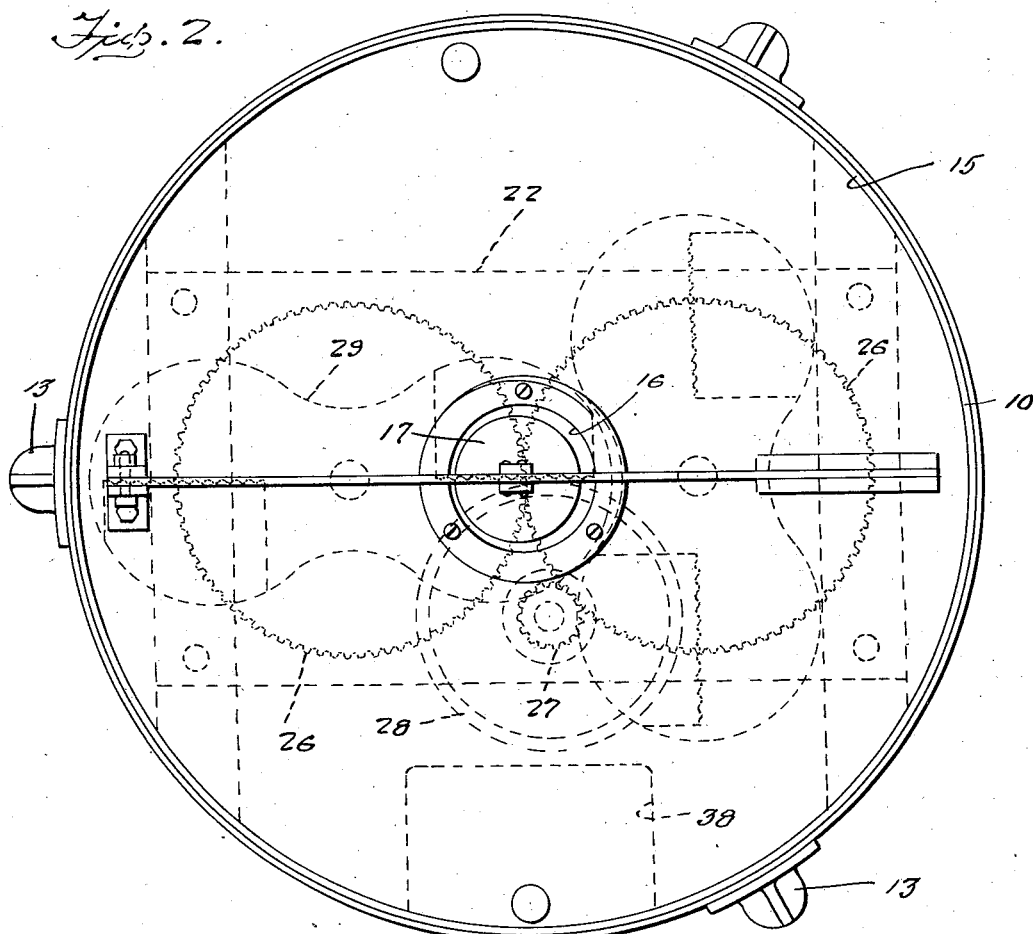
Figure 2 is a top plan view thereof.
Figure 7:
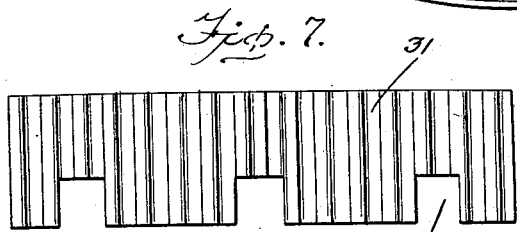
Figure 7 is a plan view of a knife.
Figure 9:
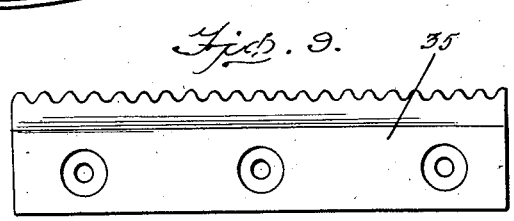
Figure 9 is a plan view of a knife guard.
Figure 10:
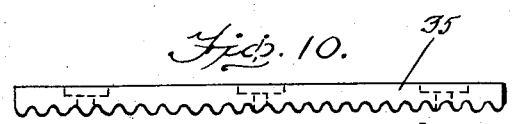
Figure 10 is an edge elevational view of the knife guard.
Figure 8:
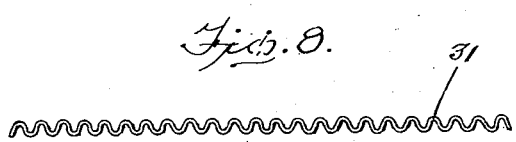
Figure 8 is an edge elevational view thereof.

Referring to the drawings by reference numerals it will be seen that the machine comprises a substantially cylindrical casing 10 secured at its lower end by suitable fastening devices 11 within an annular frame 12 supported on legs 13 equipped with casters 14. Suitably fitted on the upper end of the casing 10 is a hopper 15 provided at its center with a discharge neck 16 through which the potato to be sliced is forced through the medium of a plunger 17. The plunger 17 is provided with a stem rigidly secured to a lever or handle member 18 pivoted at one end to a bracket 19 rising from the bottom of the hopper 15. An adjustable stop, in the form of a screw 20 is provided for limiting the downward movement of the handle or lever 18.

Suitably mounted within the lower end of the casing 10 and supported by cross bars 21 provided in the frame 12 is a gear case 22. Case 22 is secured through the medium of screws 23.

The gear case 22 is provided with vertically alined bearings 24 in which are journalled the lower ends of vertical shafts 25. Provided on the shafts 25 within the case 22 are inter-meshing gears 26 one of which is in mesh with a pinion 27 provided on the armature shaft of an electric motor 28. The electric motor 28 is supported in any suitable manner and disposed vertically as shown.

Figure 4:
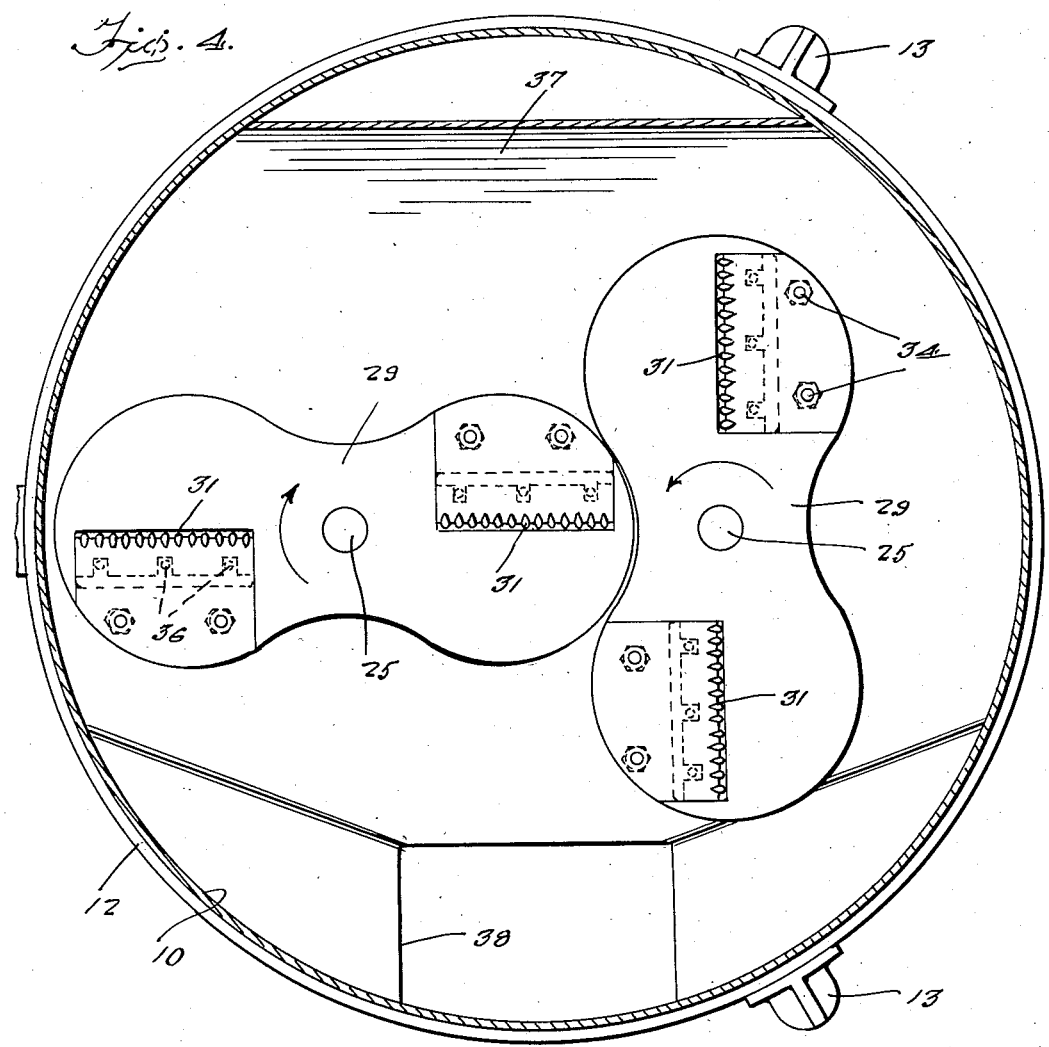
Figure 4 is a horizontal section taken substantially on the line 4—4 of Figure 3.

Provided on the upper ends of the shafts 25 are paddles 29. The paddles 29 are of the shape shown and are normally arranged at right angles to one another, one of the paddles rotating in a clockwise direction and the other of the paddles rotating in an anti-clockwise direction as shown in Figure 4 and indicated by the arrows in said figure.

Each paddle 29 is provided adjacent each end thereof with a slot 30 and disposed in operative position to the slot 30 is a knife 31.

Figure 6:
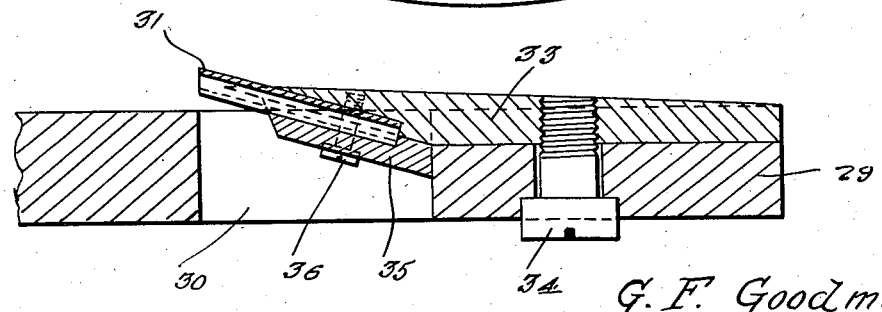
Figure 6 is an enlarged fragmentary detail sectional view through one of the paddles showing the manner of securing the slicing knife thereto.

Each knife 31, as shown, is substantially oblong and is fluted or corrugated. Also at the rear edge thereof the knife is provided with a series of notches 32. For each knife 31 there is provided a plate 33 that fits within a recess provided in the top of the paddles 29 and the plate is secured in position through the medium of a screw 34. The plate 33 has a beveled clamping plate or portion that projects into the slot 30 and between which and a clamping member 35 the slotted portion of the blade 31 is clamped through the medium of screws 36. The confronting faces of the members 33, 35 are corrugated or otherwise formed to interfittingly accommodate the knife 31 as will be clear from a study of Figure 6.

It will be noted that each paddle 29 is provided with a pair of such knives 31 the knives being arranged at opposite ends and adjacent opposite side edges of the paddle.

From the above it will be apparent that in actual practice a potato is forced through the discharge neck 16 by the pressure of the plunger 17 thereon and as the paddle 29 rotates chips or small pieces are successively cut or sliced from the main body of the potato. In this connection it will be apparent that as a knife cuts through the potato it will leave a series of arcuate grooves on the top face of the chip being sliced and a corresponding series of grooves on the under face of the next successive chip.

In this connection it will be understood that first the knife on one paddle 29 cuts a chip from the main body of the potato and then a knife on a second paddle cuts a second chip from the potato, and as a result of the direction of rotation of the paddle each sliced chip will be provided on both faces thereof with arcuate grooves with the grooves on one face being curved reversely to the grooves on the opposite face of the chip the appearance of the chip being thought clear from a consideration of Figures 11 and 12. From a consideration of these figures it will be seen that the sliced chip will have somewhat the appearance of a miniature waffle. A suitable inclined discharge chute 37 is provided within the casing 10 and at its lower end is provided with an outlet 38.

Having thus described my invention, what I claim as new is:

1. A machine for slicing potato chips comprising a pair of paddles rotatable in the same plane and on different axes with an end portion of each paddle following in the path of an end portion of the other paddle, oppositely arranged cutting knives on the end portions of each paddle, and means for feeding a potato to the knives for cutting successive chips from the potato first by a knife on one paddle and then by a knife on the other paddle.

2. A machine for slicing potato chips comprising a pair of paddles rotatable in the same plane and on different axes with an end portion of each paddle following in the path of an end portion of the other paddle, oppositely arranged cutting knives on the end portions of each paddle, and means for feeding a potato to the knives for cutting successive chips from the potato first by a knife on one paddle and then by a knife on the other paddle, and each knife having corrugated top and bottom faces whereby to provide chips having arcuate grooves in each face thereof.

3. A machine for slicing potato chips comprising a pair of paddles rotatable in the same plane and on different axes with an end portion of each paddle following in the path of an end portion of the other paddle, oppositely arranged cutting knives on the end portions of each paddle, and means for feeding a potato to the knives for cutting successive chips from the potato first by a knife on one paddle and then by a knife on the other paddle, and each knife having corrugated top and bottom faces whereby to provide chips having arcuate grooves in each face thereof, with the grooves in one face being curved reversely to the grooves in the opposite face of the chip, and driving means connected with the axes of the paddles for simultaneously rotating them.

4. A machine for slicing potato chips comprising a pair of paddles rotatable in the same plane and on different axes with an end portion of each paddle following in the path of an end portion of the other paddle, each paddle being of oblong shape, and having an inwardly directed central circular portion, oppositely arranged cutting knives on the end portions of each paddle, and means for feeding a potato to the knives for cutting successive chips from the potato first by a knife on one paddle and then by a knife on the other paddle, and each knife having corrugated top and bottom faces whereby to provide chips having arcuate grooves in each face thereof with the grooves in one face being curved reversely to the grooves in the opposite face of the chips, and driving means connected with the axes of the paddles for simultaneously rotating them.

GEORGE F. GOODMAN, JR.